United States Patent
Schroers et al.

(10) Patent No.: US 10,491,856 B2
(45) Date of Patent: Nov. 26, 2019

(54) VIDEO FRAME INTERPOLATION USING A CONVOLUTIONAL NEURAL NETWORK

(71) Applicants: Disney Enterprises, Inc., Burbank, CA (US); ETH Zürich, Zürich (CH)

(72) Inventors: Christopher Schroers, Zürich (CH); Simone Meyer, Zürich (CH); Abdelaziz Djelouah, Zürich (CH); Alexander Sorkine Hornung, Zürich (CH); Brian McWilliams, Zürich (CH); Markus Gross, Zürich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 0 days.

(21) Appl. No.: 15/974,576

(22) Filed: May 8, 2018

(65) Prior Publication Data
US 2019/0289257 A1 Sep. 19, 2019

Related U.S. Application Data

(60) Provisional application No. 62/643,580, filed on Mar. 15, 2018.

(51) Int. Cl.
*G06T 5/00* (2006.01)
*G06T 5/50* (2006.01)
(Continued)

(52) U.S. Cl.
CPC ........... *H04N 7/0135* (2013.01); *G06N 3/04* (2013.01); *G06T 5/002* (2013.01); *G06T 5/50* (2013.01)

(58) Field of Classification Search
CPC .................. H04N 21/44008; G06T 3/4046
See application file for complete search history.

(56) References Cited

U.S. PATENT DOCUMENTS 7,362,374 B2 * 4/2008 Holt .......................... G06T 7/20
                                                                  348/446
9,571,786 B1 * 2/2017 Zimmer ................ G06T 3/4084
(Continued)

OTHER PUBLICATIONS

S. Baker, D. Scharstein, J. P. Lewis, S. Roth, M. J. Black, and R. Szeliski. "A Database and Evaluation Methodology for Optical Flow." *International Journal of Computer Vision*, 92(1):1-31, 2011.
(Continued)

*Primary Examiner* — Paulos M Natnael
(74) *Attorney, Agent, or Firm* — Farjami & Farjami LLP

(57) ABSTRACT

According to one implementation, a video processing system includes a computing platform having a hardware processor and a system memory storing a frame interpolation software code, the frame interpolation software code including a convolutional neural network (CNN) trained using a loss function having an image loss term summed with a phase loss term. The hardware processor executes the frame interpolation software code to receive first and second consecutive video frames including respective first and second images, and to decompose the first and second images to produce respective first and second image decompositions. The hardware processor further executes the frame interpolation software code to use the CNN to determine an intermediate image decomposition corresponding to an interpolated video frame for insertion between the first and second video frames based on the first and second image decompositions, and to synthesize the interpolated video frame based on the intermediate image decomposition.

18 Claims, 5 Drawing Sheets

(51) Int. Cl.
*H04N 7/01* (2006.01)
*G06N 3/04* (2006.01)

(56) References Cited

U.S. PATENT DOCUMENTS

| | | | | |
|---|---|---|---|---|
| 9,911,215 | B1* | 3/2018 | Hornung | G06T 11/60 |
| 2006/0200253 | A1* | 9/2006 | Hoffberg | G05B 15/02 |
| | | | | 700/19 |
| 2014/0072228 | A1* | 3/2014 | Rubinstein | G06T 7/207 |
| | | | | 382/197 |
| 2014/0072229 | A1* | 3/2014 | Wadhwa | G06K 9/481 |
| | | | | 382/197 |
| 2016/0191159 | A1* | 6/2016 | Aoyama | H04N 21/436 |
| | | | | 398/172 |
| 2018/0103213 | A1* | 4/2018 | Holzer | H04N 5/77 |
| 2018/0293711 | A1* | 10/2018 | Vogels | G06K 9/40 |
| 2018/0365554 | A1* | 12/2018 | Van den Oord | G10L 13/00 |
| 2019/0012526 | A1* | 1/2019 | Guo | G06K 9/00288 |

OTHER PUBLICATIONS

P. Didyk, P. Sitthi-amorn, W. T. Freeman, F. Durand, and W. Matusik. "Joint View Expansion and Filtering for Automultiscopic 3D Displays." *ACM Trans. Graph.*, 32(6):221, 2013.

S. Meyer, O. Wang, H. Zimmer, M. Grosse, and A. Sorkine-Hornung. "Phase-based Frame Interpolation for Video." *IEEE Conference on Computer Vision and Pattern Recognition*, pp. 1410-1418, 2015.

S. Niklaus, L. Mai, and F. Liu. "Video Frame Interpolation Via Adaptive Separable Convolution." *IEEE International Conference on Computer Vision*, 2017.

D. Sun, S. Roth, and M. J. Black. "A Quantitative Analysis of Current Practices in Optical Flow Estimation and the Principles Behind Them." *International Journal of Computer Vision*, 106(2):115-137, 2014.

* cited by examiner

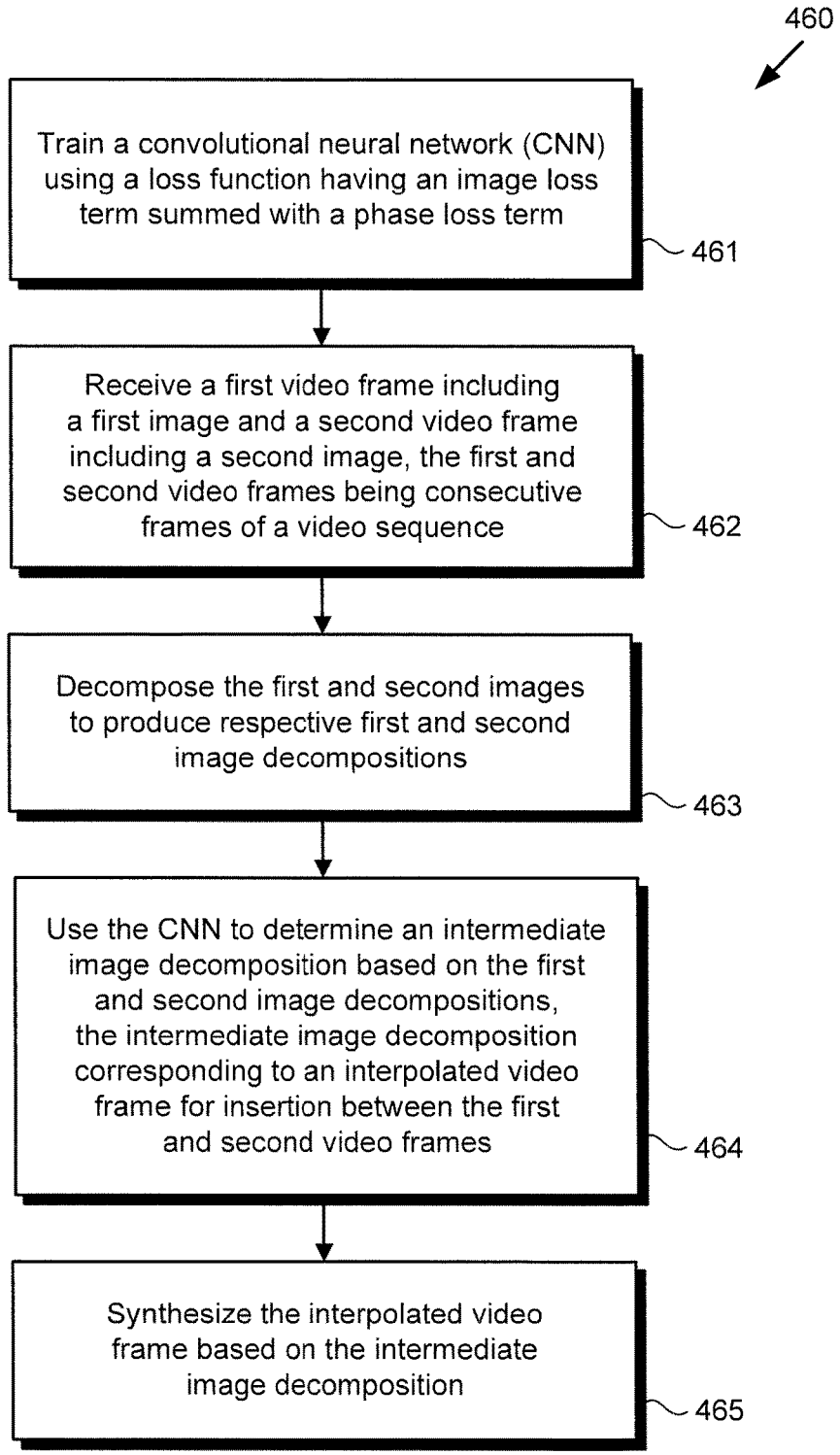

| | Name | Input | Kernel | Ch In/Out | Res | Reuse Weights |
|---|---|---|---|---|---|---|
| 542-0 | ConvProcBlock_0 | pyr_0 | 1 × 1 | 2/64 | 8 × 8 | False |
| | pred_0 | PhaseNetBlock_0 | 1 × 1 | 64/1 | 8 × 8 | False |
| 542-1 | ConvProcBlock_1 | up(PhaseNetBlock_0)+up(pred_0)+pyr_1 | 1 × 1 | (64+1+16)/64 | 12 × 12 | False |
| | pred_1 | PhaseNetBlock_1 | 1 × 1 | 64/1 | 12 × 12 | False |
| 542-2 | ConvProcBlock_2 | up(PhaseNetBlock_1)+up(pred_1)+pyr_2 | 1 × 1 | (64+8+16)/64 | 16 × 16 | False |
| | pred_2 | PhaseNetBlock_2 | 1 × 1 | 64/8 | 16 × 16 | False |
| 542-3 | ConvProcBlock_3 | up(PhaseNetBlock_2)+up(pred_2)+pyr_3 | 3 × 3 | (64+8+16)/64 | 22 × 22 | False |
| | pred_3 | PhaseNetBlock_3 | 1 × 1 | 64/8 | 22 × 22 | False |
| 542-4 | ConvProcBlock_4 | up(PhaseNetBlock_3)+up(pred_3)+pyr_4 | 3 × 3 | (64+8+16)/64 | 32 × 32 | False |
| | pred_4 | PhaseNetBlock_4 | 1 × 1 | 64/8 | 32 × 32 | False |
| 542-5 | ConvProcBlock_5 | up(PhaseNetBlock_4)+up(pred_4)+pyr_5 | 3 × 3 | (64+8+16)/64 | 46 × 46 | False |
| | pred_5 | PhaseNetBlock_5 | 1 × 1 | 64/8 | 46 × 46 | False |
| 542-6 | ConvProcBlock_6 | up(PhaseNetBlock_5)+up(pred_5)+pyr_6 | 3 × 3 | (64+8+16)/64 | 64 × 64 | False |
| | pred_6 | PhaseNetBlock_6 | 1 × 1 | 64/8 | 64 × 64 | False |
| 542-7 | ConvProcBlock_7 | up(PhaseNetBlock_6)+up(pred_6)+pyr_7 | 3 × 3 | (64+8+16)/64 | 90 × 90 | False |
| | pred_7 | PhaseNetBlock_7 | 1 × 1 | 64/8 | 90 × 90 | False |
| 542-8 | ConvProcBlock_8 | up(PhaseNetBlock_7)+up(pred_7)+pyr_8 | 3 × 3 | (64+8+16)/64 | 128 × 128 | True |
| | pred_8 | PhaseNetBlock_8 | 1 × 1 | 64/8 | 128 × 128 | True |
| 542-9 | ConvProcBlock_9 | up(PhaseNetBlock_8)+up(pred_8)+pyr_9 | 3 × 3 | (64+8+16)/64 | 182 × 182 | True |
| | pred_9 | PhaseNetBlock_9 | 1 × 1 | 64/8 | 182 × 182 | True |
| 542-10 | ConvProcBlock_10 | up(PhaseNetBlock_9)+up(pred_9)+pyr_10 | 3 × 3 | (64+8+16)/64 | 256 × 256 | True |
| | pred_10 | PhaseNetBlock_10 | 1 × 1 | 64/8 | 256 × 256 | True |

Fig. 5

VIDEO FRAME INTERPOLATION USING A CONVOLUTIONAL NEURAL NETWORK

RELATED APPLICATION(S)

The present application claims the benefit of and priority to a Provisional Patent Application Ser. No. 62/643,580, filed Mar. 15, 2018, and titled "Video Frame Interpolation Using a Convolutional Neural Network," which is hereby incorporated fully by reference into the present application.

BACKGROUND

Video frame interpolation is a video processing technique having many applications. For example, video frame interpolation may be utilized when performing frame rate conversion or in the generation of slow motion video effects. Traditional approaches to performing video frame interpolation have included identifying correspondences between consecutive frames, and using those correspondences to synthesize the interpolated intermediate frames through warping. Unfortunately, however, those traditional approaches typically suffer from the inherent ambiguities in estimating the correspondences between consecutive frames, and are particularly sensitive to occlusions/dis-occlusion, changes in colors, and changes in lighting.

In an attempt to overcome the limitations of traditional methods for performing video frame interpretation, alternative approaches have been explored. One such alternative approach relies on phased-based decomposition of the input images. However, the conventional methods based on this alternative approach are limited in the range of motion they can handle. Consequently, there remains a need in the art for a video processing solution capable of interpolating video frames for challenging scenes containing changes in color, changes in light, and/or motion blur.

SUMMARY

There are provided systems and methods for performing video frame interpolation using a convolutional neural network, substantially as shown in and/or described in connection with at least one of the figures, and as set forth more completely in the claims.

BRIEF DESCRIPTION OF THE DRAWINGS

FIG. 4 shows a flowchart presenting an exemplary method for performing video frame interpolation using a CNN, according to one implementation; and FIG. 5 shows a table providing exemplary details of the architecture of the CNN depicted by FIGS. 2 and 3, according to one implementation.

DETAILED DESCRIPTION

Figure 1:
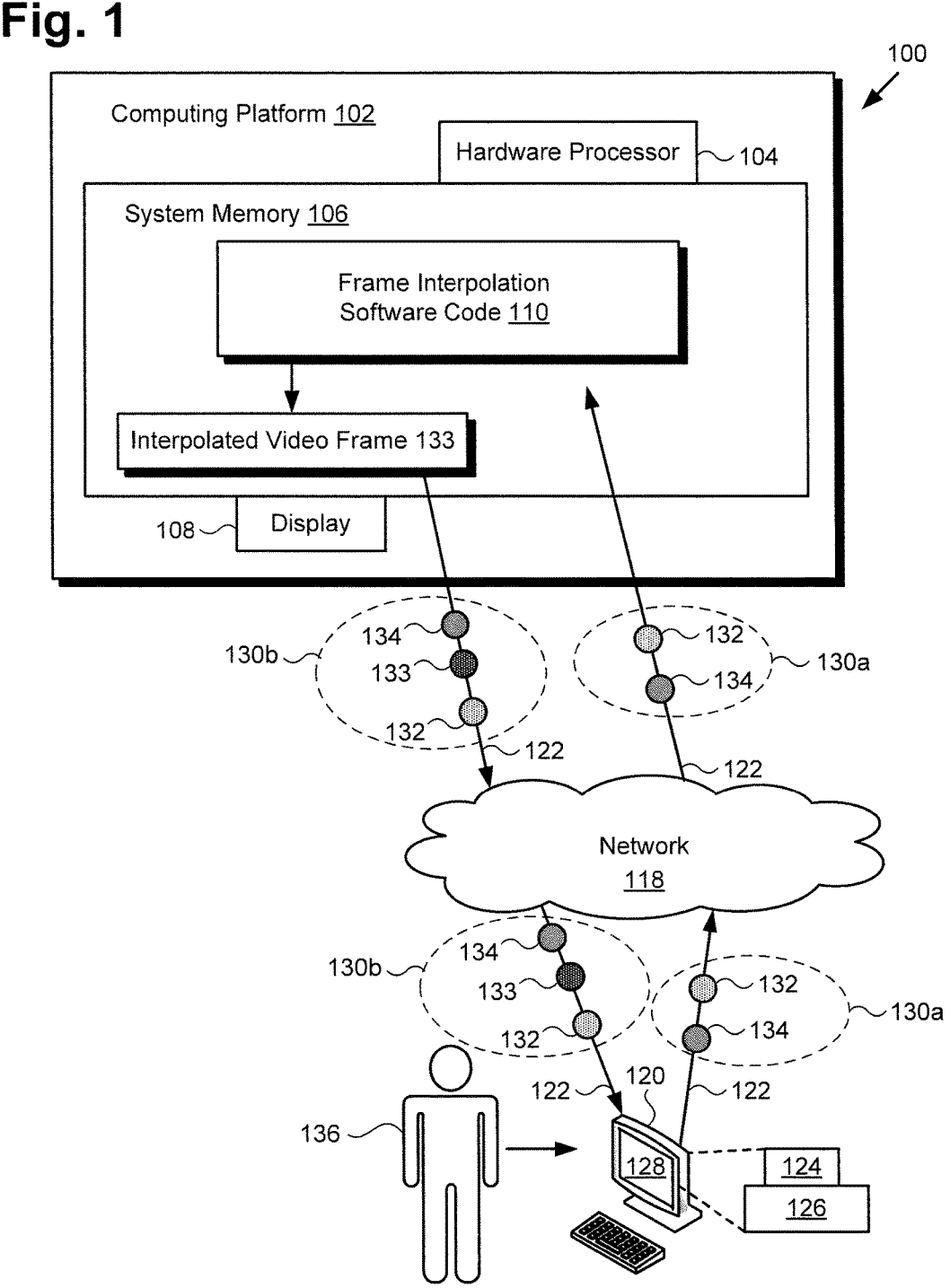
FIG. 1 shows a diagram of an exemplary system for performing video frame interpolation using a convolutional neural network (CNN), according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a video processing solution suitable for use in performing video frame interpolation that overcomes the drawbacks and deficiencies in the conventional art. In one implementation, the present solution does so at least in part by utilizing a convolutional neural network (CNN) configured to receive phase-based decompositions of images contained in consecutive video frames and to determine a phase-based intermediate decomposition of an image of in-between video frame based on those received image decompositions. In one implementation, the CNN architecture disclosed in the present application mirrors in its structure the phase-based decomposition applied to the video frame images, and may be configured to determine phase and amplitude values of the intermediate image decomposition resolution level-by-resolution level.

The CNN architecture disclosed herein is advantageously designed, in one implementation, to require relatively few parameters. In a further implementation, the present solution introduces a "phase loss" during training of the CNN that is based on the phase difference between an image included in an interpolated in-between video frame and the corresponding true image (hereinafter "ground truth" or "ground truth image"). In addition, the phase loss encodes motion relevant information.

To achieve efficient and stable training, in one implementation, the present solution uses a hierarchical approach to training that starts from estimating phase values at lower resolution levels and incrementally proceeds to the next higher resolution level. As such, the present video processing solution may advantageously outperform existing state-of-the-art methods for video frame interpolation when applied to challenging video imagery.

It is noted that, as defined in the present application, a CNN is a deep artificial neural network including layers that apply one or more convolution operations to an input to the CNN. Such a CNN is a machine learning engine designed to progressively improve its performance of a specific task. In various implementations, CNNs may be utilized to perform video processing or natural-language processing.

FIG. 1 shows a diagram of an exemplary system for perfuming video frame interpolation using a CNN, according to one implementation. As shown in FIG. 1, video processing system 100 includes computing platform 102 having hardware processor 104, system memory 106 implemented as a non-transitory storage device, and display 108. According to the present exemplary implementation, system memory 106 stores frame interpolation software code 110.

As further shown in FIG. 1, video processing system 100 is implemented within a use environment including communication network 118, user system 120 including user system hardware processor 124, user system memory 126, and display 128, as well as user 136 utilizing user system 120. It is noted that display 108, as well as display 128 of user system 120, may be implemented as a liquid crystal display (LCD), a light-emitting diode (LED) display, an organic light-emitting diode (OLED) display, or another suitable display screen that performs a physical transformation of signals to light.

FIG. 1 further shows network communication links 122 interactively connecting user system 120 and video processing system 100 via communication network 118, video sequence 130a including first and second consecutive video frames 132 and 134, and interpolated video frame 133 synthesized using frame interpolation software code 110. Also shown in FIG. 1 is video sequence 130b including first and second video frames 132 and 134, and interpolated video frame 133 inserted between first and second video frames 132 and 134.

It is noted that, although the present application refers to frame interpolation software code 110 as being stored in system memory 106 for conceptual clarity, more generally, frame interpolation software code 110 may be stored on any computer-readable non-transitory storage medium. The expression "computer-readable non-transitory storage medium," as used in the present application, refers to any medium, excluding a carrier wave or other transitory signal, capable of providing instructions to a hardware processor, such as hardware processor 104 of computing platform 102 or hardware processor 124 of user system 120, for example. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts frame interpolation software code 110 as being stored in its entirety in system memory 106, that representation is also provided merely as an aid to conceptual clarity. More generally, video processing system 100 may include one or more computing platforms 102, such as computer servers for example, which may be co-located, or may form an interactively linked but distributed system, such as a cloud based system, for instance.

As a result, hardware processor 104 and system memory 106 may correspond to distributed processor and memory resources within video processing system 100. Thus, it is to be understood that various features of frame interpolation software code 110, such as one or more of the features described below by reference to FIG. 2, may be stored and/or executed using the distributed memory and/or processor resources of video processing system 100.

According to the implementation shown by FIG. 1, user 136 may utilize user system 120 to interact with video processing system 100 over communication network 118. In one such implementation, video processing system 100 may correspond to one or more web servers, accessible over a packet-switched network such as the Internet, for example. Alternatively, video processing system 100 may correspond to one or more computer servers supporting a local area network (LAN), or included in another type of limited distribution network.

Although user system 120 is shown as a desktop computer in FIG. 1, that representation is also provided merely as an example. More generally, user system 120 may be any suitable mobile or stationary computing device or system that implements data processing capabilities sufficient to provide a user interface, support connections to communication network 118, and implement the functionality ascribed to user system 120 herein. For example, in other implementations, user system 120 may take the form of a laptop computer, tablet computer, or smartphone, for example. User 136 may utilize user system 120 to interact with video processing system 100 to use frame interpolation software code 110 to synthesize interpolated video frame 133 for insertion between first and second video frames 132 and 134.

It is noted that, in some implementations, frame interpolation software code 110 may be utilized directly by user system 120. For example, frame interpolation software code 110 may be transferred to user system memory 126, via download over communication system 118, for example, or via transfer using a computer-readable non-transitory medium, such as an optical disc or FLASH drive. In those implementations, frame interpolation software code 110 may be persistently stored on user system memory 126, and may be executed locally on user system 120 by user system hardware processor 124.

Figure 2:
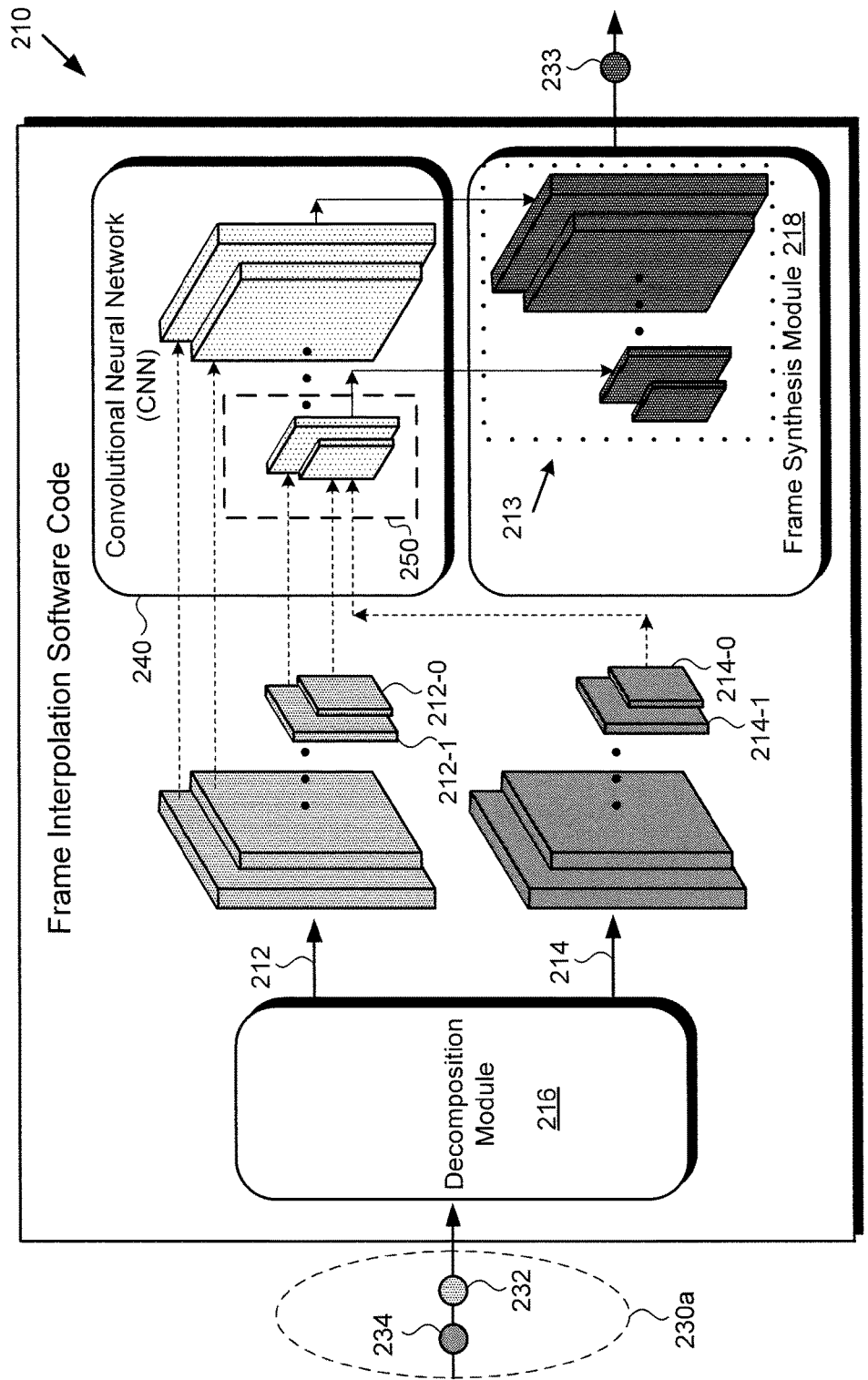
FIG. 2 shows an exemplary diagram of a software code suitable for execution by a hardware processor of the system shown by FIG. 1, according to one implementation.

FIG. 2 shows exemplary frame interpolation software code 210 suitable for execution by hardware processor 104 of computing platform 102 or by hardware processor 124 of user system 120, in FIG. 1, according to one implementation. As shown in FIG. 2, frame interpolation software code 210 may include CNN 240. In addition, FIG. 2 shows video sequence 230a including first and second consecutive video frames 232 and 234, as well as interpolated video frame 233.

As further shown in FIG. 2, frame interpolation software code 210 can include decomposition module 216 providing first and second image decompositions 212 and 214 corresponding respectively to consecutive images contained in first and second consecutive video frames 312 and 314, intermediate image decomposition 213 determined using CNN 240, and frame synthesis module 218. Also shown in FIG. 2 is portion 250 of CNN 240, which is depicted in greater detail in FIG. 3, as well as lowest resolution levels 212-0 and 214-0, and next higher resolution levels 212-1 and 214-1 of respective first and second image decompositions 212 and 214.

Video sequence 230a including first and second consecutive video frames 232 and 234, and interpolated video frame 233 correspond respectively in general to video sequence 130a including first and second consecutive video frames 132 and 134, and interpolated video frame 133, in FIG. 1, and those corresponding features may share any of the characteristics attributed to either corresponding feature by the present disclosure. In addition, frame interpolation software code 210 corresponds in general to frame interpolation software code 110, and those corresponding features may share any of the characteristics attributed to either corresponding feature by the present disclosure. That is to say, like frame interpolation software code 210, frame interpolation software code 110 may include a CNN corresponding to CNN 240, as well as features corresponding respectively to decomposition module 216 and frame synthesis module 218.

Figure 3:
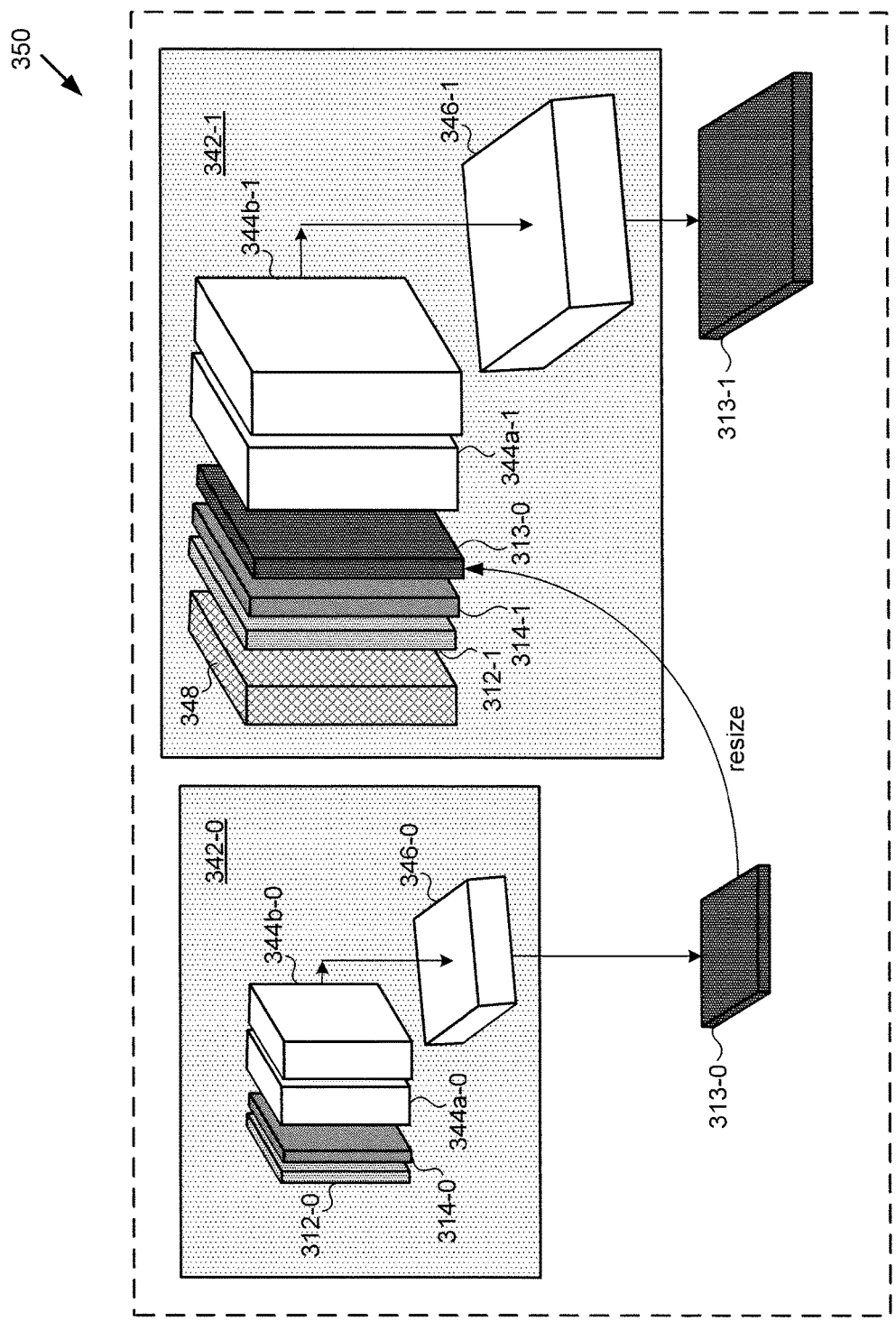
FIG. 3 shows a diagram of an exemplary portion of the CNN included in the software code of FIG. 2.

FIG. 3 shows a more detailed depiction of a portion of a CNN suitable for use in software code 110/210, according to one implementation. CNN portion 350 corresponds in general to portion 250 of CNN 240, in FIG. 2, and those corresponding features may share any of the characteristics attributed to either corresponding feature by the present disclosure. It is noted that CNN portion 350, in FIG. 3, is a merely exemplary implementation of portion 250 of CNN 240.

In addition, FIG. 3 shows lowest resolution levels 312-0 and 314-0, and next higher resolution levels 312-1 and 314-1 of first and second image decompositions corresponding respectively in general to first and second image decompositions 212 and 214, in FIG. 2. That is to say, lowest resolution level image decompositions 312-0 and 314-0 correspond respectively to lowest resolution levels 212-0 and 214-0 of first and second image decompositions 212 and 214, while next higher resolution level image decompositions 312-1 and 314-1 correspond respectively to next higher resolution levels 212-1 and 214-1 of first and second image decompositions 212 and 214. FIG. 3 also shows lowest resolution level intermediate image decomposition 313-0 and next higher resolution level intermediate image decomposition 313-1, which correspond respectively to the lowest resolution level and next higher resolution level of intermediate image decomposition 213, in FIG. 2.

As shown by FIG. 3, CNN portion 350, and thus CNN 240, includes multiple convolutional processing blocks including convolutional processing blocks 342-0 and 342-1. As further shown in FIG. 3, convolutional processing block 342-0 is configured to determine lowest resolution level 313-0 of intermediate image decomposition 213 based on lowest resolution levels 212-0/312-0 and 214-0/314-0 of respective first and second image decompositions 212 and 214. Convolutional processing block 342-1 is analogously configured to determine next higher resolution level 313-1 of intermediate image decomposition 213 based on next higher resolution levels 212-1/312-1 and 214-1/314-1 of respective first and second image decompositions 212 and 214.

Also shown in FIG. 3 are successive convolutional layers 344a-0 and 344b-0 and 344a-1 and 344b-1 of respective convolutional processing blocks 342-0 and 342-1, as well as final processing layers 346-0 and 346-1 of those respective convolutional processing blocks. Convolutional processing block 342-1 also includes intermediate features map 348 and lowest resolution level intermediate image decomposition 313-0, which has been resized and provided as an input to convolutional processing block 342-1.

The functionality of frame interpolation software code 110/210 and CNN 240 will be further described by reference to FIG. 4 in combination with FIGS. 1, 2, and 3. FIG. 4 shows flowchart 460 presenting an exemplary method for performing video frame interpolation using a CNN, according to one implementation. With respect to the method outlined in FIG. 4, it is noted that certain details and features have been left out of flowchart 460 in order not to obscure the discussion of the inventive features in the present application.

Referring now to FIG. 4 in combination with FIGS. 1, 2, and 3, flowchart 460 begins with training CNN 240 using a loss function having an image loss term summed with a phase loss term (action 461). As noted above, the architecture of CNN 240 is configured to mirror in its structure the phase-based decomposition applied to the video frames CNN 240 is used to process, and may be configured to determine phase and amplitude values of intermediate image decompositions resolution level-by-resolution level. For exemplary purposes, the present description of video frame interpolation will refer to a specific but non-limiting implementation in which phase-based image decomposition is performed using a complex-valued steerable pyramid, as known in the art.

CNN 240 is trained to enable software code 120/220 to determine an intermediate image included in an interpolated video frame, given as inputs the images included in video frames neighboring the interpolated video frame. However, rather than directly predicting the color pixel values of the intermediate image, CNN 240 predicts the values of the complex-valued steerable pyramid decomposition of the intermediate image. Thus, the goal of training is to predict the phase values of the intermediate image included in the interpolated video frame based on the complex-valued steerable pyramid decomposition of the input video frame images.

An exemplary implementation of the architecture of CNN 240 is shown in FIGS. 2 and 3, and is motivated by the complex-valued steerable pyramid decomposition of images. As shown in those figures, CNN 240 may be structured as a decoder-only network increasing resolution level by level. At each level, the corresponding decomposition information from input images is processed by a convolutional processing block designed for that level.

It is noted that although FIG. 3 shows two convolutional processing blocks 342-0 and 342-1 in order to show those blocks in detail, in practice, the number of convolutional processing blocks included in CNN 240 corresponds to the number of levels of the complex-valued steerable pyramid used for image decomposition. Thus, convolutional processing block 342-0 corresponds to the lowest resolution level of the complex-valued steerable pyramid, convolutional processing block 342-1 corresponds to the next higher resolution level of the complex-valued steerable pyramid, and so forth. It is further noted that all convolutional processing blocks other than lowest level convolutional processing block 342-0, i.e., convolutional processing blocks 342-1 . . . 342-n are substantially identical in structure.

In the interests of stability, a hierarchical training procedure may be adopted, where the lowest level convolutional processing blocks are trained first. That is to say, the convolutional processing blocks corresponding to lower resolution levels of the complex-valued steerable pyramid used for image decomposition may be trained independently of convolutional processing blocks corresponding to higher resolution levels of the complex-valued steerable pyramid.

The exemplary training procedure described in the present application can be seen as a form of curriculum training that aims at improving training by gradually increasing the difficulty of the learning task. According to the present exemplary implementation, use of a complex-valued steerable pyramid decomposition on input images automatically provides a coarse to fine representation of those images that is well suited for such a hierarchical training approach.

Given input images $I_1$ and $I_2$, and ground truth intermediate image I, CNN 240 is trained to determine a predicted intermediate image $\hat{I}$ that is as close as possible to ground truth image I. The input images $I_1$ and $I_2$ are decomposed using the complex-valued steerable pyramid. By applying the complex-valued steerable pyramid filters $\Psi_{\omega,\theta}$, which include quadrature pairs, the input images $I_1$ and $I_2$ can be decomposed into a set of scale and orientation dependent complex-valued sub-bands $R_{\omega,\theta}(x,y)$:

$$R_{\omega,\theta}(x,y) = (I * \Psi_{\omega,\theta})(x,y) \qquad \text{(Equation 1)}$$

$$= C_{\omega,\theta}(x,y) + i S_{\omega,\theta}(x,y) \qquad \text{(Equation 2)}$$

$$= A_{\omega,\theta}(x,y) e^{i\phi_{\omega,\theta}(x,y)} \qquad \text{(Equation 3)}$$

where $C_{\omega,\theta}(x,y)$ is the cosine part and $S_{\omega,\theta}(x,y)$ is the sine part. Because they represent the even-symmetric and odd-symmetric filter response, respectively, it is possible to compute for each sub-band the amplitude:

$$A_{\omega,\theta}(x,y) = |R_{\omega,\theta}(x,y)| \qquad \text{(Equation 4)}$$

and the phase values:

$$\phi_{\omega,\theta}(x,y) = \text{Im}(\log(R_{\omega,\theta}(x,y))), \qquad \text{(Equation 5)}$$

where Im represents the imaginary part of the term. The frequencies that cannot be captured in the levels of the complex-valued steerable pyramid can be summarized in real valued high-pass and low-pass residuals $r_h$ and $r_l$, respectively.

The input images $I_1$ and $I_2$ are decomposed using Equation 1 to yield respective image decompositions $R_1$ and $R_2$ as:

$$R_i = \Psi(I_i) = \{\{(\phi_{\omega,\theta}^i, A_{\omega,\theta}^i) | \omega, \theta\}, r_l^i, r_h^i\} \quad \text{(Equation 6)}$$

These image decompositions $R_1$ and $R_2$ are the inputs to CNN 240. Using to these values, the training objective is to determine $\hat{R}$, the decomposition of the predicted intermediate image $\hat{I}$ corresponding to the interpolated video frame to be inserted between the video frames containing images $I_1$ and $I_2$. We introduce the prediction function, $\mathcal{F}$, learned with CNN 240 using the parameters A. Denoting $\Psi^{-1}$ as the reconstruction function, the predicted intermediate image $\hat{I}$ corresponding to the interpolated video frame is:

$$\hat{I} = \Psi^{-1}(\hat{R}) = \Psi^{-1}(\mathcal{F}(R_1, R_2; \Lambda)) \quad \text{(Equation 7)}$$

CNN 240 is trained to minimize the objective function, or loss function, $\mathcal{L}$, (hereinafter "loss function") over a dataset, $\mathcal{D}$, including triplets of images $I_1$, $I_2$, and ground truth intermediate image I:

$$\Lambda^* = \arg\!\Lambda\min \mathbb{E}_{I_1, I_2, I \sim \mathcal{D}}[\mathcal{L}(\mathcal{F}(R_1, R_2; \Lambda), I)] \quad \text{(Equation 8)}$$

The training objective is to predict, through a determination performed using CNN 240, the intermediate image decomposition values $\hat{R}$ that lead to a predicted intermediate image $\hat{I}$ similar to the ground truth image $\hat{I}$. The training also penalizes deviation from the ground truth image decomposition R. Thus, a loss function $\mathcal{L}$ is utilized that includes an image loss term summed with a phase loss term.

For the image loss term, the $l_1$-norm of pixel images is used to express the image loss as:

$$\mathcal{L}_1 = \|I - \hat{I}\|_1 \quad \text{(Equation 9)}$$

Regarding the phase loss term, it is noted that the predicted intermediate image decomposition $\hat{R}$ of the intermediate image $\hat{I}$ corresponding to the interpolated video frame includes amplitudes and phase values for each level and orientation present in the complex-valued steerable pyramid decomposition. To improve the quality of the intermediate image, a loss term that captures the deviations $\Delta\hat{\phi}$ of the predicted phase $\hat{\phi}$ from the ground truth phase $\phi$ is summed with the image loss term. The phase loss term is defined as the $l_1$ loss of the phase difference values over all levels ($\omega$) and orientations ($\theta$):

$$\mathcal{L}_{phase} = \Sigma_{10\tau,\theta} \|\Delta\phi_{\omega,\theta}\|_1 \quad \text{(Equation 10)}$$

where $\Delta\hat{\phi}$ is defined as:

$$\Delta\hat{\phi} = a\tan 2(\sin(\phi - \hat{\phi}), \cos(\phi - \hat{\phi})) \quad \text{(Equation 11)}$$

Finally, we define the loss function $\mathcal{L}$ using the image loss term and the phase loss term as:

$$\mathcal{L} = \mathcal{L}_1 + v\mathcal{L}_{phase} \quad \text{(Equation 12)}$$

where v is a weighting factor applied to the phase loss term. That is to say, in some implementations, the phase loss term $\mathcal{L}_{phase}$ of loss function $\mathcal{L}$ is weighted relative to the image loss term $\mathcal{L}_1$. Moreover in some implementations, the weighting factor v may be less than one (1.0). In one exemplary implementation, for instance, the weighting factor v may be approximately 0.1. It is noted, however, that in some implementations, it may be advantageous or desirable for the weighting factor v to be greater than one.

Referring once again to FIG. 4 in combination with FIGS. 1 and 2, and in view of the description provided above, flowchart 460 continues with receiving first video frame 132/232 including a first image $I_1$ and second video frame 134/234 including a second image $I_2$, where first and second video frames 132/232 and 134/234 are consecutive frames of video sequence 130a/230a (action 462).

User 136 may utilize user system 120 to interact with video processing system 100 in order to synthesize interpolated video frame 133/233 for insertion between first and second video frames 132/232 and 134/234 in video sequence 130b. As shown by FIG. 1, in one implementation, user 136 may do so by transmitting video sequence 130a/230a including first and second consecutive video frames 132/232 and 134/234 from user system 120 to video processing system 100 via communication network 118 and network communication links 122. Alternatively, video sequence 130a/230a may be received from a third party source, or may be stored in system memory 106. Video sequence 130a/230a including first and second consecutive video frames 132/232 and 134/234 may be received by frame interpolation software code 110/210, executed by hardware processor 104.

Flowchart 460 continues with decomposing first and second images $I_1$ and $I_2$ included in respective first and second consecutive video frames 132/232 134/234 to produce first and second image decompositions $R_1$ 212 and $R_2$ 214 (action 463). As discussed above, in some implementations, first and second images $I_1$ and $I_2$ may be decomposed using a complex-valued steerable pyramid to filter first and second images $I_1$ and $I_2$, according to Equation 1 above. First and second images $I_1$ and $I_2$ may be decomposed by frame interpolation software code 110/210, executed by hardware processor 104, and using decomposition module 216.

Flowchart 460 continues with using CNN 240 to determine intermediate image decomposition $\hat{R}$ 213 based on first and second image decompositions $R_1$ 212 and $R_2$ 214, where intermediate image decomposition $\hat{R}$ 213 corresponds to interpolated video frame 133/233 for insertion between first and second video frames 132/232 and 134/234 (action 464). Determination of intermediate image decomposition $\hat{R}$ 213 based on first and second image decompositions $R_1$ 212 and $R_2$ 214 may be performed by frame interpolation software code 110/210, executed by hardware processor 104, and using CNN 240.

Referring to FIG. 5, FIG. 5 shows table 540 providing details of an architecture of CNN 240 depicted by FIGS. 2 and 3, according to one implementation. As shown in FIG. 5, table 540 includes implementational details for each of convolutional processing blocks 542-0, 542-1, 542-2, 542-3, 542-4, 542-5, 542-6, 542-7, 542-8, 542-9, and 542-10 (hereinafter "convolutional processing blocks 542-0 and 542-1 through 542-10").

Table 540 corresponds in general to the architecture of CNN 240. Thus, CNN 240 may include the convolutional processing blocks 542-0 and 542-1 through 542-10 described by table 540. In addition, convolutional processing blocks 542-0 and 542-1 correspond respectively in general to convolutional processing blocks 342-0 and 342-1, in FIG. 3, and those corresponding features may share any of the characteristics attributed to either corresponding feature by the present disclosure. Moreover, because each of convolutional processing blocks 542-1 through 542-10 is substantially identical in structure, each of convolutional processing blocks 542-1 through 542-10 may include the features described above by reference to convolutional processing block 342-1.

Thus, each of convolutional processing blocks 542-1 through 542-10 includes successive convolutional processing layers corresponding to successive convolutional processing layers 344a-1 and 344b-1, as well as a final processing layer corresponding to final processing layer 346-1. Furthermore, each of convolutional processing blocks 542-1 through 542-10 also includes elements corresponding respectively in general to intermediate features map 348 and a next lower resolution level intermediate image decomposition determined by the next lower level convolutional processing block.

It is noted that the next lower resolution level intermediate image decomposition determined by the next lower level convolutional processing block is resized before being provided as an input to each of convolutional processing blocks 542-1 through 542-10. In other words, the intermediate image decomposition output of each of convolutional processing blocks 542-0 and 542-1 through 542-9, but not convolutional processing block 542-10, is resized and provided as an input to the next convolutional processing blocks in sequence, from convolutional processing block 542-1 to convolutional processing block 542-10.

Convolutional processing block 542-0 is configured to determine lowest resolution level 313-0 of intermediate image decomposition $\hat{R}$ 213 based on lowest resolution levels 212-0/312-0 and 214-0/314-0 of respective first and second image decompositions $R_1$ 212 and $R_2$ 214. Convolutional processing block 542-1 is analogously configured to determine next higher resolution level 313-1 of intermediate image decomposition $\hat{R}$ 213 based on next higher resolution levels 212-1/312-1 and 214-1/314-1 of respective first and second image decompositions $R_1$ 212 and $R_2$ 214, and so forth, through convolutional processing block 542-10.

According to the present exemplary implementation, each of convolutional processing blocks 542-0 and 542-1 through 542-10 corresponds respectively to a resolution level of the complex-valued steerable pyramid applied to first and second images $I_1$ and $I_2$ by decomposition module 216, in action 462. For example, convolutional processing block 542-0 may correspond to the lowest resolution level of the complex-valued steerable pyramid, while convolutional processing block 542-10 may correspond to the highest resolution level of the complex-valued steerable pyramid. Moreover, convolutional processing blocks 542-1 through 542-9 may correspond respectively to progressively higher resolution levels of the complex-valued steerable pyramid between the lowest and the highest resolution levels.

In some implementations, CNN 240 may determine intermediate image decomposition $\hat{R}$ 213 using convolutional processing blocks 542-0 and 542-1 through 542-10 in sequence, beginning with convolutional processing block 542-0 corresponding to the lowest resolution level of the complex-valued steerable pyramid and ending with convolutional processing block 542-10 corresponding to the highest resolution level of the complex-valued steerable pyramid. Thus, in those implementations, intermediate image decomposition $\hat{R}$ 213 may be determined by CNN 240 level-by-level with respect to the resolution levels of the complex-valued steerable pyramid, from a lowest resolution level to a highest resolution level, using convolutional processing blocks 542-0 and 542-1 through 542-10 in sequence.

Flowchart 460 can conclude with synthesizing interpolated video frame 133/233 based on intermediate image decomposition $\hat{R}$ 213 (action 465). By way of example, the reconstruction function $\Psi^{-1}$ can be applied to intermediate image decomposition $\hat{R}$ 213 to produce intermediate image $\hat{I}$ in a manner analogous to Equation 7, above. Interpolated video frame 133/233 may then be synthesized to include intermediate image $\hat{I}$. Synthesis of interpolated video image 133/233 may be performed by frame interpolation software code 110/210, executed by hardware processor 104, and using frame synthesis module 218.

It is noted that, although not included in flowchart 460, in some implementations, the present method can include rendering video sequence 130b including interpolated video frame 133/233 inserted between first and second video frames 132/232 and 134/234, on a display, such as display 108 or display 128 of user system 120. As noted above, in some implementations, frame interpolation software code 110/210 including CNN 240 may be stored on a computer-readable non-transitory medium, may be transferred to user system memory 126, and may be executed by user system hardware processor 124. Consequently, the rendering of video sequence 130b including interpolated video frame 133/233 inserted between first and second video frames 132/232 and 134/234 on display 108 or display 128 may be performed by frame interpolation software code 110/210, executed respectively by hardware processor 104 of computing platform 102 or by user system hardware processor 124.

Thus, the present application discloses a video processing solution suitable for use in performing video frame interpolation. The present solution utilizes a CNN configured to receive phase-based decompositions of images contained in consecutive video frames and to determine the phase-based intermediate decomposition of an image contained in an in-between video frame based on those received image decompositions. The disclosed CNN architecture is simple and is advantageously designed to require relatively few parameters. Moreover, the present solution introduces the concept of phase loss during training of the CNN that is based on the phase difference between an image included in an interpolated in-between video frame and its corresponding ground truth. Consequently, the present video processing solution advantageously outperforms existing state-of-the-art methods for video frame interpolation when applied to challenging video imagery including changes in color, changes in lighting, and/or motion blur.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video processing system comprising:
   a computing platform including a display, a hardware processor, and a system memory;
   a frame interpolation software code stored in the system memory, the frame interpolation software code including a convolutional neural network (CNN) trained using a loss function having an image loss term summed with a phase loss term, the CNN having a plurality of convolutional processing blocks including a first subset of the plurality of convolutional processing blocks trained independently of a second subset of the plurality of convolutional processing blocks;

the hardware processor configured to execute the frame interpolation software code to:

receive a first video frame including a first image and a second video frame including a second image, the first and second video frames being consecutive;

decompose the first and second images to produce respective first and second image decompositions;

use the CNN to determine an intermediate image decomposition based on the first and second image decompositions, the intermediate image decomposition corresponding to an interpolated video frame for insertion between the first and second video frames;

synthesize the interpolated video frame based on the intermediate image decomposition; and render a video sequence including the interpolated video frame inserted between the first and second video frames on the display.

2. The video processing system of claim 1, wherein the phase loss term of the loss function is weighted relative to the image loss term.

3. The video processing system of claim 1, wherein a weighting factor applied to the phase loss term is less than one.

4. The video processing system of claim 1, wherein the first and second images are decomposed using a complex-valued steerable pyramid to filter the first and second images.

5. The video processing system of claim 4, wherein each of the plurality of convolutional processing blocks corresponds respectively to a resolution level of the complex-valued steerable pyramid.

6. The video processing system of claim 5, wherein the CNN is configured to determine the intermediate image decomposition using the plurality of convolutional processing blocks in sequence, beginning with a convolutional processing block corresponding to a lowest resolution level of the complex-valued steerable pyramid and ending with a convolutional processing block corresponding to a highest resolution level of the complex-valued steerable pyramid.

7. The video processing system of claim 5, wherein convolutional processing blocks corresponding to lower resolution levels of the complex-valued steerable pyramid are trained independently of convolutional processing blocks corresponding to higher resolution levels of the complex-valued steerable pyramid.

8. The video processing system of claim 5, wherein the intermediate image decomposition is determined by the CNN level-by-level with respect to resolution levels of the complex-valued steerable pyramid, from a lowest resolution level to a highest resolution level, using the plurality of convolutional processing blocks in sequence.

9. The video processing system of claim 5, wherein an output of each convolutional processing block except a convolutional processing block corresponding to a highest resolution level of the complex-valued steerable pyramid is resized and provided as an input to a next one of the plurality of convolutional processing blocks in sequence.

10. A method for use by a video processing system including a display, a computing platform having a hardware processor, and a system memory storing a frame interpolation software code including a convolutional neural network (CNN) trained using a loss function having an image loss term summed with a phase loss term, the CNN having a plurality of convolutional processing blocks including a first subset of the plurality of convolutional processing blocks trained independently of a second subset of the plurality of convolutional processing blocks, the method comprising:

receiving, using the hardware processor, a first video frame including a first image and a second video frame including a second image, the first and second video frames being consecutive;

decomposing, using the hardware processor, the first and second images to produce respective first and second image decompositions;

using the hardware processor and the CNN to determine an intermediate image decomposition based on the first and second image decompositions, the intermediate image decomposition corresponding to an interpolated video frame for insertion between the first and second video frames;

synthesizing, using the hardware processor, the interpolated video frame based on the intermediate image decomposition; and rendering, using the hardware processor, a video sequence including the interpolated video frame inserted between the first and second video frames on the display.

11. The method of claim 10, wherein the phase loss term of the loss function is weighted relative to the image loss term.

12. The method of claim 10, wherein a weighting factor applied to the phase loss term is less than one.

13. The method of claim 10, wherein decomposing the first and second images comprises filtering the first and second images using a complex-valued steerable pyramid.

14. The method of claim 13, wherein each of the plurality of convolutional processing blocks corresponds respectively to a resolution level of the complex-valued steerable pyramid.

15. The method of claim 14, wherein the CNN is configured to determine the intermediate image decomposition using the plurality of convolutional processing blocks in sequence, beginning with a convolutional processing block corresponding to a lowest resolution level of the complex-valued steerable pyramid and ending with a convolutional processing block corresponding to a highest resolution level of the complex-valued steerable pyramid.

16. The method of claim 14, wherein convolutional processing blocks corresponding to lower resolution levels of the complex-valued steerable pyramid are trained independently of convolutional processing blocks corresponding to higher resolution levels of the complex-valued steerable pyramid.

17. The method of claim 14, wherein the intermediate image decomposition is determined by the CNN level-by-level with respect to resolution levels of the complex-valued steerable pyramid, from a lowest resolution level to a highest resolution level, using the plurality of convolutional processing blocks in sequence.

18. The method of claim 14, wherein an output of each convolutional processing block except a convolutional processing block corresponding to a highest resolution level of the complex-valued steerable pyramid is resized and provided as an input to a next one of the plurality of convolutional processing blocks in sequence.

* * * * *